US012687528B2

(12) United States Patent
Tobita et al.

(10) Patent No.: US 12,687,528 B2
(45) Date of Patent: Jul. 21, 2026

(54) AUTOMATIC ANALYZER INCLUDING HPLC AND CONTROL METHOD FOR THE SAME

(71) Applicant: HITACHI HIGH-TECH CORPORATION, Tokyo (JP)

(72) Inventors: Midori Tobita, Tokyo (JP); Daisuke Akieda, Tokyo (JP); Makoto Nogami, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 355 days.

(21) Appl. No.: 18/554,237

(22) PCT Filed: Feb. 4, 2022

(86) PCT No.: PCT/JP2022/004376
§ 371 (c)(1),
(2) Date: Oct. 6, 2023

(87) PCT Pub. No.: WO2022/219893
PCT Pub. Date: Oct. 20, 2022

(65) Prior Publication Data
US 2024/0192180 A1 Jun. 13, 2024

(30) Foreign Application Priority Data
Apr. 14, 2021 (JP) ................................. 2021-068408

(51) Int. Cl.
| | |
|---|---|
| *G01N 30/32* | (2006.01) |
| *G01N 30/02* | (2006.01) |
| *G01N 30/38* | (2006.01) |
| *G01N 30/46* | (2006.01) |
| *G01N 30/88* | (2006.01) |

(52) U.S. Cl.
CPC ........... *G01N 30/32* (2013.01); *G01N 30/468* (2013.01); *G01N 2030/027* (2013.01);
(Continued)

(58) Field of Classification Search
CPC ................. G01N 30/32; G01N 30/468; G01N 2030/027; G01N 2030/328;
(Continued)

(56) References Cited

U.S. PATENT DOCUMENTS 2,972,246 A * 2/1961 Reinecke ............. G01N 30/466
73/23.39
12,298,283 B2 * 5/2025 Akieda ................... G01N 30/32
(Continued)

FOREIGN PATENT DOCUMENTS

| | | |
|---|---|---|
| JP | S57-110959 A | 7/1982 |
| JP | H01-142461 A | 6/1989 |

(Continued)

OTHER PUBLICATIONS

International Search Report, mailed Apr. 19, 2022, for International Application No. PCT/JP2022/004376.
(Continued)

*Primary Examiner* — Claire A Norris
(74) *Attorney, Agent, or Firm* — Baker Botts L.L.P.

(57) ABSTRACT

An automatic analyzer includes a liquid feed unit including a liquid feed unit and a liquid feed flow passage and feeding a mobile phase, a sample introduction unit introducing a sample to the mobile phase, a separation column separating the sample into plural components, a detector detecting the component, and a control unit. A pressure sensor detecting pressure of the liquid feed flow passage is provided, and the control unit calculates a pressure rise rate of the time immediately after starting liquid feeding of the mobile phase based on the pressure detected by the pressure sensor and a compression pressure variation amount and a pressure average after continuing liquid feeding of the mobile phase for a certain time, and determines completion of equilibration of the separation column.

3 Claims, 7 Drawing Sheets

(52) U.S. Cl.
    CPC . *G01N 2030/324* (2013.01); *G01N 2030/328*
        (2013.01); *G01N 2030/385* (2013.01); *G01N*
        *2030/8804* (2013.01)

(58) Field of Classification Search
    CPC ....... G01N 2030/324; G01N 2030/385; G01N
        2030/8804; B01D 15/14; B01D 15/08
    USPC .............................................. 210/198.2, 635
    See application file for complete search history.

(56)                References Cited

U.S. PATENT DOCUMENTS

| | | | | |
|---|---|---|---|---|
| 2014/0299542 | A1* | 10/2014 | Song | G01M 3/2815 |
| | | | | 210/635 |
| 2016/0236114 | A1 | 8/2016 | Brann | |

| | | | |
|---|---|---|---|
| 2018/0364205 | A1 | 12/2018 | Beals et al. |
| 2022/0050088 | A1 | 2/2022 | Akieda et al. |
| 2022/0187255 | A1 | 6/2022 | Ohashi et al. |

FOREIGN PATENT DOCUMENTS

| | | | |
|---|---|---|---|
| JP | | H04-184167 A | 7/1992 |
| JP | | 2008-209334 A | 9/2008 |
| JP | | 2011-099764 A | 5/2011 |
| JP | | 2020-524282 A | 8/2020 |
| WO | WO 2020/175510 A1 | | 9/2020 |
| WO | WO 2020/179001 A1 | | 9/2020 |

OTHER PUBLICATIONS

Written Opinion, mailed Apr. 19, 2022, for International Application No. PCT/JP2022/004376 (without English translation).

* cited by examiner

AUTOMATIC ANALYZER INCLUDING HPLC AND CONTROL METHOD FOR THE SAME

TECHNICAL FIELD

The present invention relates to an automatic analyzer including HPLC and a control method for the same.

BACKGROUND ART

HPLC (high-performance liquid chromatograph) is an analyzer reducing the particle diameter of the filler of the separation column and executing analysis using liquid compressed by the liquid feed device under a high pressure aiming to shorten the analysis time and to improve the separation performance in a liquid chromatograph that is a chromatograph using liquid as a mobile phase fed to a separation column that separates a sample.

The liquid sample including the analysis object introduced to the analysis flow passage from the injection unit is fed to the separation column by the mobile phase. The component detection method by an automatic analyzer including HPLC is a method where the liquid sample is separated into plural components using the difference of the affinity of the fixed phase and the mobile phase filled in the separation column and each component having been separated is detected using the detector.

The measurement data of HPLC are indicated by a peak showing the relation between the holding time of the sample and the signal strength of the detector. The holding time is the time of the peak top and shows a generally same value for each sample component when the analysis condition is same. Therefore, the holding time is used as the information for identifying the separated component.

When analysis by HPLC is to be started, as the preparation for measurement, initial solvent used for analysis is fed, and column equilibration is executed. In the column equilibration, it is common to feed the solvent of 10 times or more of the column volume, and completion of equilibration is determined by a user using stability of the pressure variation and the base line of the detector and so on as a guide.

After starting the measurement, there are a case that the liquid feed pressure and the detection time of the analysis object component change toward one direction and a case where the user determines that equilibration has not been sufficient yet and executes measurement again.

Also, liquid feeding in the analysis by HPLC is executed under a high pressure.

In Patent Literature 1, there is described a technology where the upper and lower limit values of the normal pressure of the pump are monitored, and when the pressure exceeds the upper limit for example, abnormality of the pressure is alarmed and the user executes checking. When the pressure is abnormal, it is necessary to stop liquid feeding immediately to prevent breakage of the liquid feed pump and to check whether the flow passage is not clogged.

Also, when the pressure is below the lower limit, whether or not there are abnormality of the liquid feed pump and leakage from the pipe connection portion is to be checked.

CITATION LIST

Patent Literature

Patent Literature 1: US Patent 2016/0236114 A1

SUMMARY OF INVENTION

Technical Problem

However, according to the technology described in Patent Literature 1, as described above, when the pressure is abnormal, it is necessary to stop liquid feeding immediately to prevent breakage of the liquid feed pump and to check whether the flow passage is not clogged.

Also, when the pressure is below the lower limit, it is necessary to check whether or not there are abnormality of the liquid feed pump and leakage from the pipe connection portion.

Checking of them involved troublesome works by the user such as attaching and detaching of the piping and identification of the leakage position, and consumption of the solvent increased. Also, the user was obliged to determine completion of equilibration of the column, and the burden of the user increased.

The object of the present invention is to provide an automatic analyzer including HPLC and a control method for the same enabling to automatically execute determination of completion with respect to equilibration of the column performed as a preparatory operation of the measurement and to simultaneously identify the position of an error when the error occurs in the equilibration process.

Solution to Problem

In order to achieve the object described above, the present invention is configured as described below.

In an automatic analyzer including HPLC that includes a liquid feed unit including a liquid feed device and a liquid feed flow passage connected to the liquid feed device and feeding a mobile phase, a sample introduction unit introducing a sample to the mobile phase fed from the liquid feed unit, a separation column to which the sample is introduced from the sample introduction unit, the separation column separating the sample into a plurality of components, a detector detecting the component separated by the separation column, and a control unit controlling the liquid feed unit, the sample introduction unit, and the detector, the liquid feed unit includes a pressure sensor detecting pressure of the liquid feed flow passage, and the control unit calculates a pressure rise rate of the time immediately after starting liquid feeding of the mobile phase by the liquid feed unit and a compression pressure variation amount and a pressure average after continuing liquid feeding of the mobile phase by the liquid feed unit by a certain time based on the pressure detected by the pressure sensor, and determines completion of equilibration of the separation column.

Also, in a control method of an automatic analyzer including HPLC, the automatic analyzer including a liquid feed unit including a liquid feed device and a liquid feed flow passage connected to the liquid feed device and feeding a mobile phase, a sample introduction unit introducing a sample to the mobile phase, a separation column separating the sample into a plurality of components, a detector detecting the separated component, and a control unit controlling the liquid feed unit, the sample introduction unit, and the detector, pressure of the liquid feed flow passage is detected, a pressure rise rate immediately after starting liquid feeding of the mobile phase by the liquid feed unit and a compression pressure variation amount and a pressure average after continuing liquid feeding of the mobile phase by the liquid feed unit by a certain time are calculated based on the pressure detected, and completion of equilibration of the separation column is determined.

Advantageous Effects of Invention

According to the present invention, it is possible to provide an automatic analyzer including HPLC and a control method for the same enabling to automatically execute determination of completion with respect to equilibration of the column performed as a preparatory operation of the measurement and to simultaneously identify the position of an error when the error occurs in the equilibration process.

BRIEF DESCRIPTION OF DRAWINGS

FIG. 1 is a schematic configuration drawing of an automatic analyzer including HPLC related to the first embodiment.

FIG. 5 is a schematic configuration drawing of an automatic analyzer including HPLC related to the second embodiment.

FIG. 7 is a schematic configuration drawing of a display unit in the second embodiment.

DESCRIPTION OF EMBODIMENTS

Figure 2:
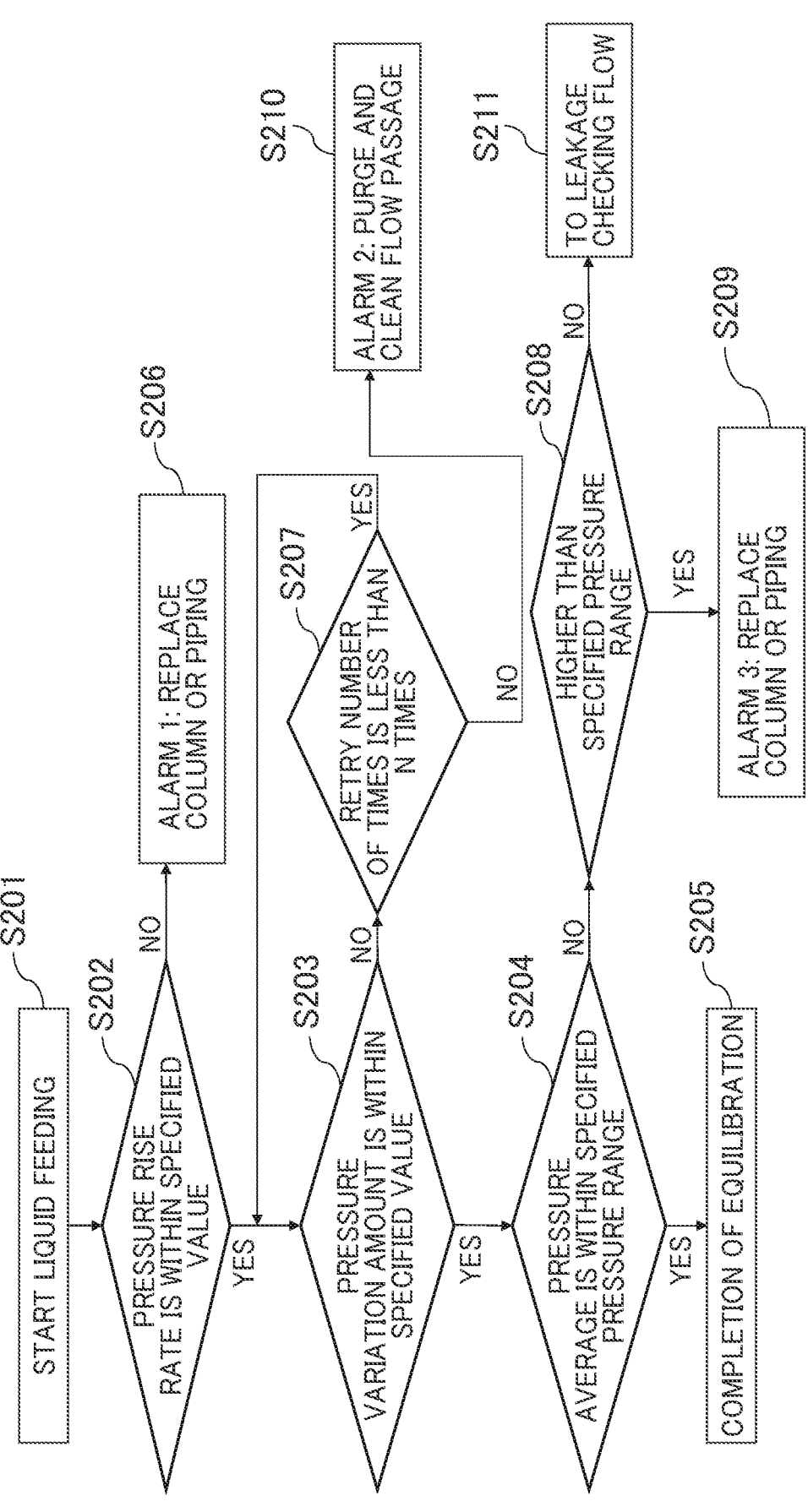
FIG. 2 is a flowchart for determining column equilibration completion in the first embodiment.

Embodiments of the present invention will be explained referring to the attached drawings.

A work flow of the automatic analyzer by the present invention will be explained. The work flow is configured of each steps of "start-up step" of starting up the automatic analyzer after turning on the power supply and executing checking of communication between the analysis unit and the control unit and checking of the state of each sensor and each consumable, "preparatory step before measurement" where the user or the service person selects and executes the maintenance item, "main measurement step" of executing calibration measurement, QC (quality control) measurement used to maintain the quality of the analysis, and sample measurement, "standby step" for standby after the main measurement step, "preparatory step after measurement" of executing preparation for turning off the automatic analyzer, and "shut-off step" for turning off the automatic analyzer.

The present invention is to be executed in "preparatory step before measurement" of the work flow described above.

EMBODIMENTS

First Embodiment

Figure 1:
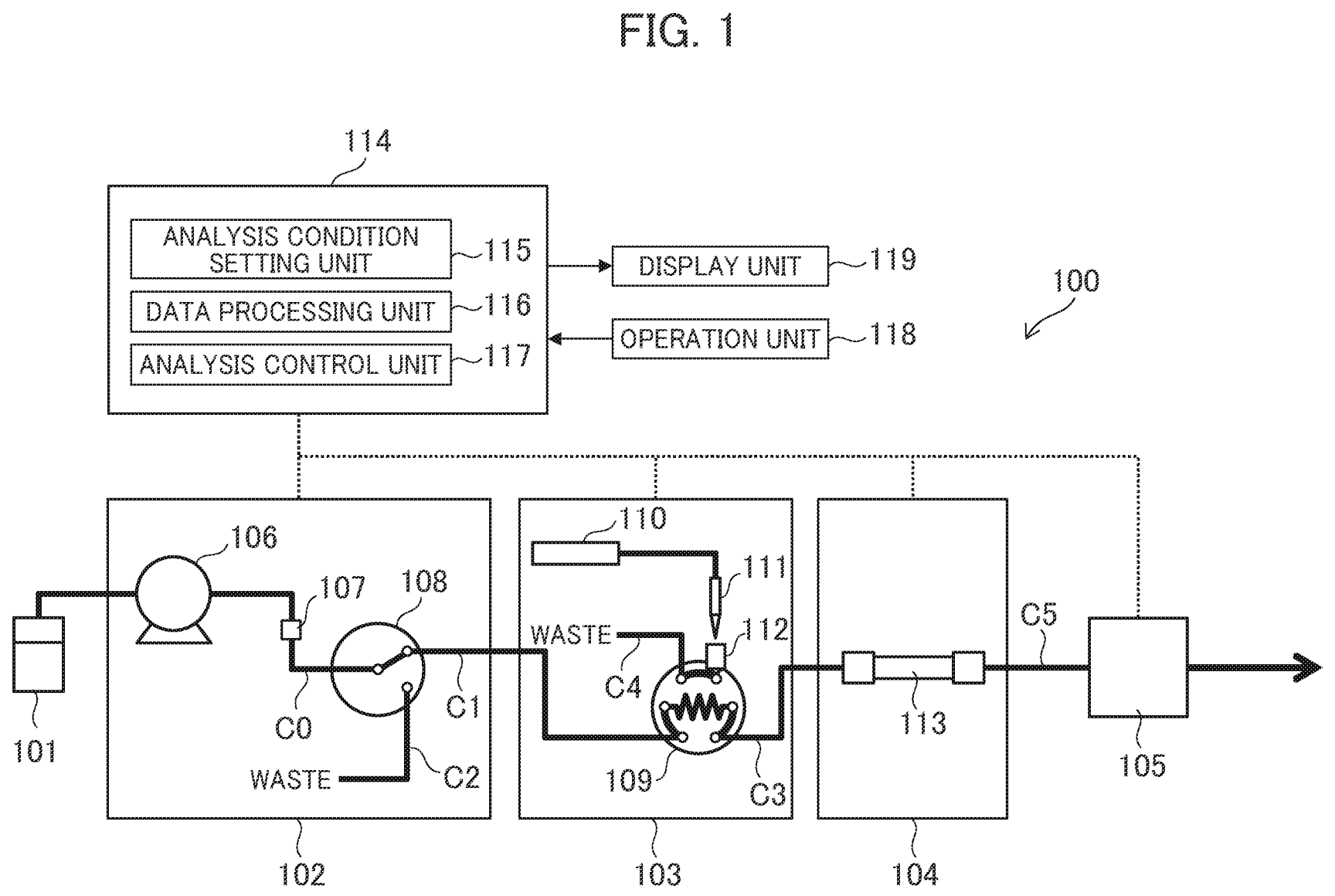

FIG. 1 is a schematic configuration drawing of an automatic analyzer 100 including HPLC related to the first embodiment of the present invention.

In FIG. 1, the automatic analyzer 100 including HPLC is schematically configured of a mobile phase tank 101, a liquid feed unit 102, a sample introduction unit 103, a column temperature regulation unit 104, a detector 105, an integrated control unit 114, an operation unit 118, and a display unit 119.

The liquid feed unit 102 (liquid feed portion) and the sample introduction unit 103 (sample introduction portion) are connected to each other through an analysis flow passage C1 (first analysis flow passage), and a mobile phase is introduced to the sample introduction unit 103.

As an example, the liquid feed unit 102 includes a liquid feed device 106, a pressure detector 107, a purge valve 108, a liquid feed flow passage C0, the analysis flow passage C1 (first analysis flow passage), and a waste liquid flow passage C2. The liquid feed device 106 has a function of aspiring a mobile phase used for transportation and separation of a sample from the mobile phase tank 101 and compressing at a high pressure and discharging the mobile phase.

As an example, this liquid feed unit 102 can be configured as an HPLC system capable of feeding a single or a plurality of mobile phase from one set of the liquid feed device 106.

The pressure detector 107 is a sensor device (pressure sensor) detecting (monitoring) pressure within the liquid feed flow passage C0 feeding the mobile phase of the liquid feed unit 102 and piping to the detector 105. The purge valve 108 is connected to the downstream side of the liquid feed device 106, and has a function of connecting the liquid feed flow passage C0 selectively to the analysis flow passage C1 connected to the sample introduction unit 103 or to the waste liquid flow passage C2.

Also, the purge valve 108 is configured to be capable of forming a closed state of being connected to neither of the analysis flow passage C1 nor the waste liquid flow passage C2 when a pressure test is to be conducted.

The sample introduction unit 103 is schematically configured of a sample introduction valve 109, a sample metering pump 110, and a needle 111. The sample introduction valve 109 is connected to the analysis flow passage C1 described above, and has a switching function for introducing the mobile phase to an analysis flow passage C3 (second analysis flow passage) in the downstream. The sample introduction valve 109 includes a sample introduction port 112 that is for introducing the sample. The sample metering pump 110 has a function of discharging the sample of the analysis object to this sample introduction port 112 through the needle 111. The sample introduced to the sample introduction valve 109 from the sample metering pump 110 is mixed with the mobile phase and is discharged to the analysis flow passage C3. The sample introduction valve 109 is connected also to a waste liquid flow passage C4.

The column temperature regulation unit 104 is capable of storing a separation column 113, and the separation column 113 is connected to the sample introduction unit 103 through the analysis flow passage C3 and separates the sample introduced from the sample introduction unit 103 by the mobile phase into plural components. The detector 105 is connected to downstream of the column temperature regulation unit 104 through an analysis flow passage C5 (third analysis flow passage), and has a function of detecting each component of the sample separated in the separation column 113.

The integrated control unit 114 is a control unit for controlling the liquid feed unit 102, the sample introduction unit 103, the column temperature regulation unit 104, and the detector 105 to acquire HPLC data.

As an example, the integrated control unit 114 includes an analysis condition setting unit 115 for setting an analysis condition for controlling the liquid feed unit 102, the sample introduction unit 103, and the column temperature regulation unit 104 described above, a data processing unit 116 analyzing an analysis result outputted by the detector 105, and an analysis control unit 117 allowing each unit 102 to 104 to output starting timing and the like for each analysis.

The integrated control unit 114 calculates a pressure rise rate of the time immediately after starting liquid feeding of the mobile phase by the liquid feed unit 102 and a compression pressure variation amount and a pressure average after continuing liquid feeding by a certain time based on the pressure detected by the pressure sensor 107, and automatically determines completion of equilibration of the separation column 113.

The operation unit 118 includes an input device such as a keyboard, a numeric keypad, and a mouse for example, and is a device for inputting various kind of instructions with respect to control in the integrated control unit 114 by the user.

The display unit 119 is a device for displaying the analysis condition and the analysis result, and can be configured of a liquid crystal display, an organic EL display, and the like for example.

Next, an example of the procedure for determination of completion of column equilibration in the automatic analyzer 100 including HPLC in the first embodiment will be explained referring to the flowchart illustrated in FIG. 2. Determination of completion of column equilibration is executed by the integrated control unit 114.

After starting liquid feeding as the preparatory operation of the measurement, when the separation column 113 and the piping are clogged for example, the pressure rise rate increases. If liquid feeding is continued as it is, even when liquid feeding stops by the limit of the pressure, the pressure exceeds largely, and the components within the automatic analyzer 100 may possibly have harmful effects.

Therefore, immediately after starting liquid feeding in step S201, the integrated control unit (also referred to simply as the control unit) 114 calculates the rising rate of the pressure detected by the pressure detector 107, and determines whether or not the pressure rise rate is within the specified rise rate value in step S202.

When the pressure rise rate is larger than the specified rise rate value, the process proceeds to step S206, an alarm 1 (alarm for replacement of the separation column or the piping) is displayed on the display unit 119, liquid feeding is stopped immediately, and thereby the damage of the automatic analyzer 100 can be minimized.

Figure 3B:
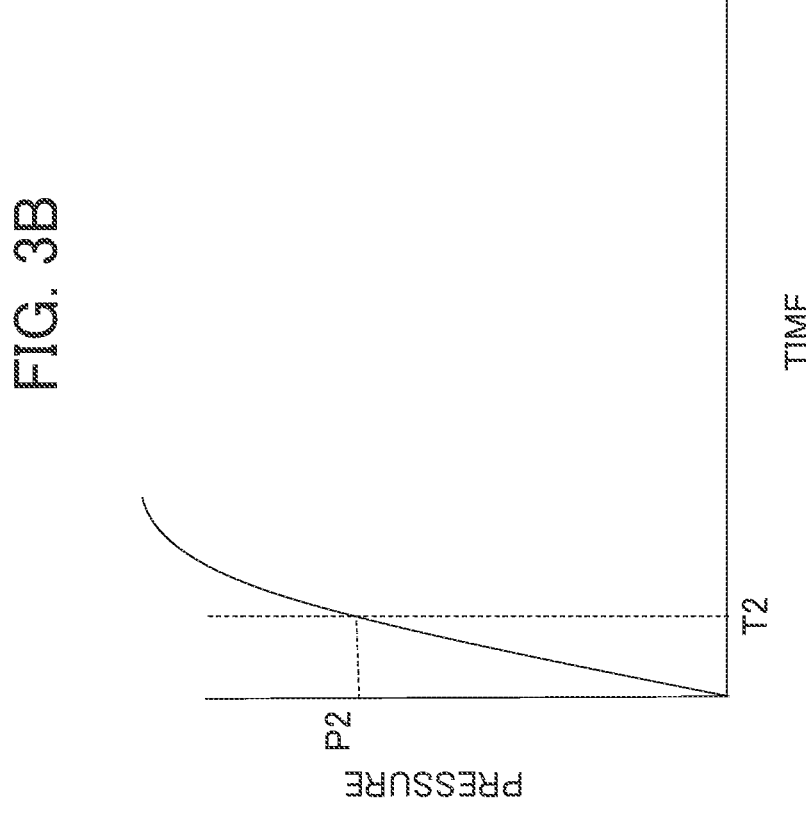
FIG. 3B is a graph when the pressure rise rate is out of a specified value in FIG. 2.
Figure 3A:
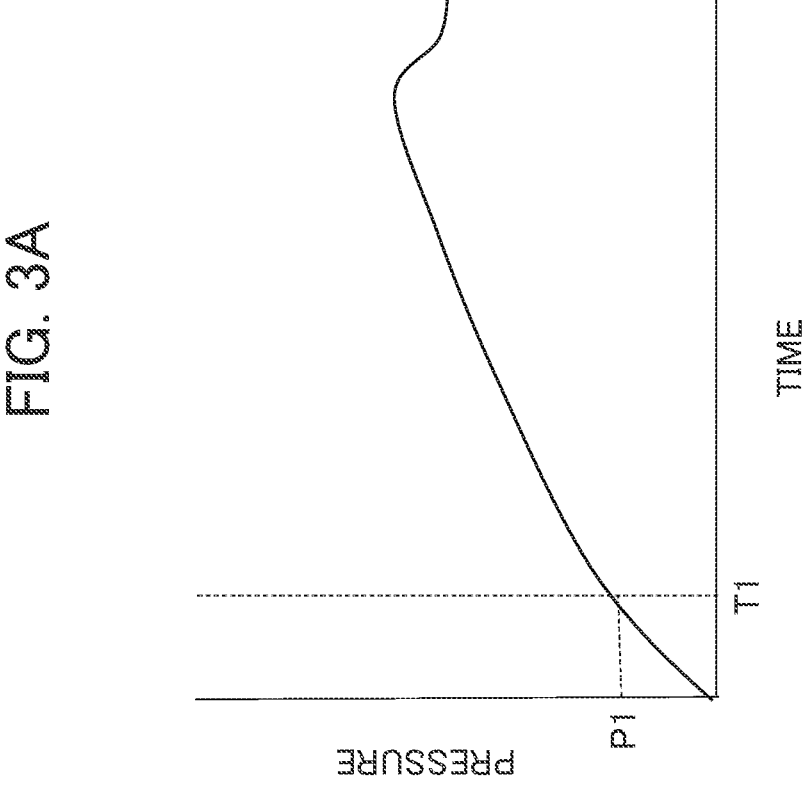
FIG. 3A is a graph when the pressure rise rate is within a specified value in FIG. 2.

FIG. 3A is a graph illustrating the pressure variation in normal liquid feeding, and FIG. 3B is a graph illustrating the pressure variation in abnormal liquid feeding. By monitoring the pressure and the time (P/T), abnormal pressure rise can be determined immediately, and liquid feeding can be stopped. The specified value differs according to the separation column 113, the piping system, and the flow passage system used, and is to be decided experimentally. When the pressure rise rate is larger than the specified value, the alarm 1 is generated as described above, and the user is urged to replace the separation column or the piping.

When the pressure rise rate is within the specified value in step S202, liquid feeding is continued, the process proceeds to step S203, and liquid feeding is continued until the pressure variation amount becomes within the specified pressure variation amount value.

That is to say, whether or not the pressure variation amount is within the specified pressure variation amount value is determined in step S203, unless the pressure variation amount is within the specified value, the process proceeds to step S207, whether or not the retry number of times is less than N times (predetermined number of times of determination) is determined, and the process returns to step S203 when the retry number of times is less than N times.

When the retry number of times is N times in step S207, it is determined that the pressure variation amount did not become within the specified pressure variation amount value described above, the process proceeds to step S210 in that case, and an alarm 2 (an alarm for purging and cleaning the flow passage) is displayed on the display unit 119.

The time over which liquid feeding is continued differs according to the column volume and the solvent to be used, and the user can set the time over which liquid feeding is continued. Also, when the pressure variation amount does not become within the specified pressure variation amount value within the set time, it is possible to continue (retry) liquid feeding again until the set time elapses, and the user can set the number of times of retry N.

When the pressure variation amount becomes within the specified value within the set time in step S203, the process proceeds to step S204, and whether or not the pressure average is within the specified pressure range is determined. For example, when the separation column 113 normally used at 60 MPa is used and the user sets 55 MPa to 65 MPa as the specified value, if the pressure average is within the specified pressure range, it is determined that equilibration has been completed.

Also, the process proceeds to step S205, and equilibration is completed.

When the pressure average is not within the specified pressure range in step S204, the process proceeds to step S208, and whether or not the pressure average is higher than the specified pressure range is determined. When the pressure average is higher than the specified pressure upper limit value (65 MPa for example) in step S208, the process proceeds to step S209, an alarm 3 (an alarm for replacing the separation column or the piping) is displayed on the display unit 119, and the user is urged to replace the column and the piping.

Figure 4:
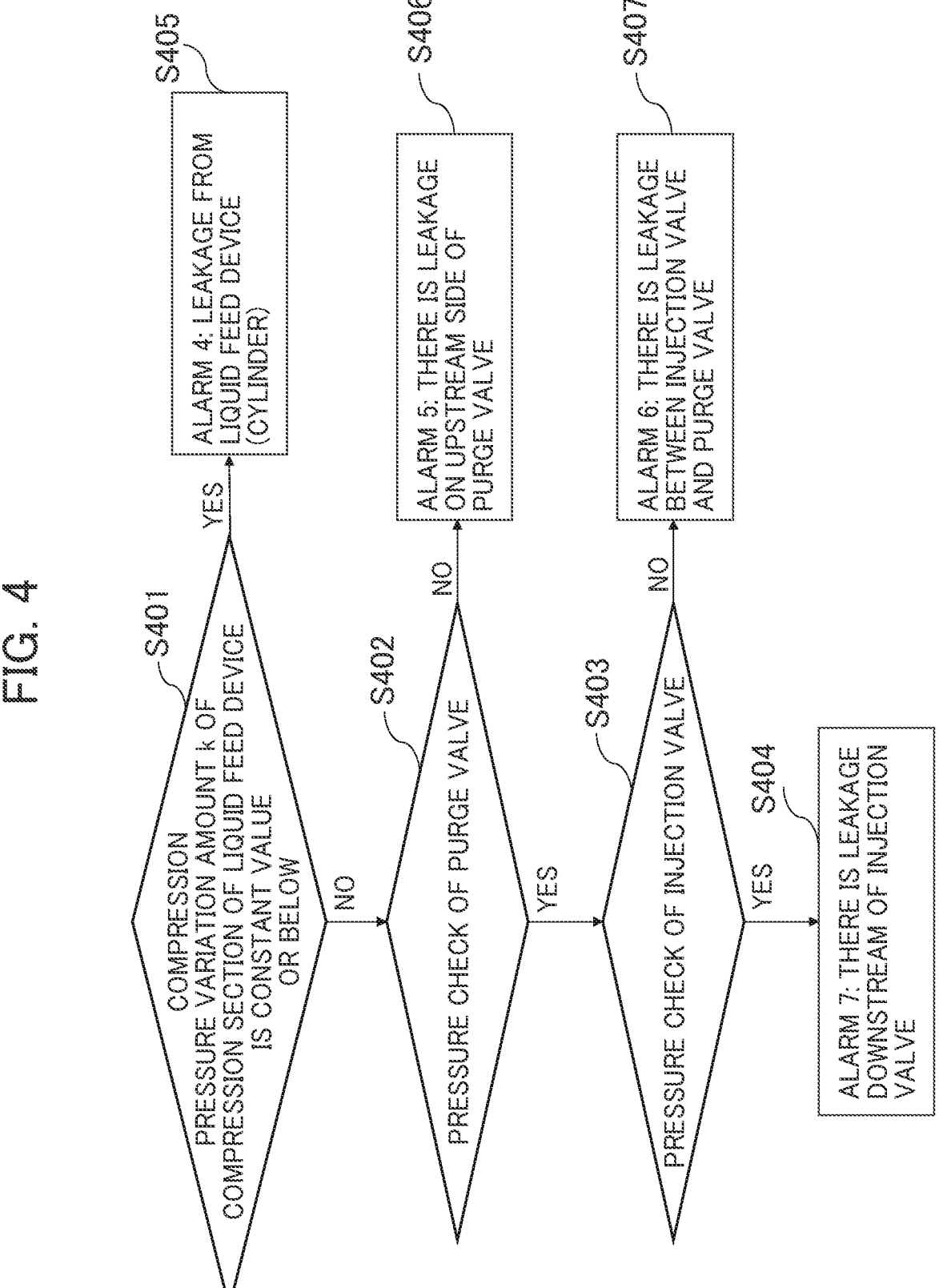
FIG. 4 is a flowchart in executing an identification process of a leak position in the first embodiment.

When the pressure average is lower than the specified pressure lower limit value (55 MPa for example) in step S208, leakage from the pipe connection portion and the like is questioned, the process proceeds to step S211, and in which portion of the pipe leakage has occurred (has been generated) is determined according to the work flow illustrated in FIG. 4 which is a leakage checking flow.

Reference is made to FIG. 4 that illustrates the leakage checking flow shown in step S211 illustrated in FIG. 2.

In step S401 of FIG. 4, whether or not the compression pressure variation amount k in the compression section of the liquid feed device 106 is a certain value (specified compression pressure variation amount) or below is determined. When the compression pressure variation amount k is the certain value or below, the process proceeds to step S405, it is determined that there is a portion where leakage from the cylinder within the liquid feed device 106 occurs, and an alarm 4 (an alarm that leakage of feed liquid from the cylinder within the liquid feed device 106 occurs) is displayed on the display unit 119.

In this case, the user is required to execute replacement of a consumable component such as a plunger seal within the cylinder of the liquid feed device 106.

When the compression pressure variation amount k is not the certain value (specified compression pressure variation amount) or below and there is no abnormality in step S401, the process proceeds to step S402, the purge valve 108 is made a closed state to execute pressure checking, and whether the purge valve 108 is normal or not is determined.

The purge valve 108 can be brought to a closed state by being shifted to the position of not being connected to any flow passage as described above.

Also, the purge valve 108 may be brought to a closed state by once detaching the piping and then attaching an air stopper, or by providing a port attached with an air stopper in the purge valve 108.

When the pressure check result of the purge valve 108 is abnormal in step S402, the process proceeds to step S406, an alarm 5 (an alarm that there is leakage of liquid feeding on the upstream side of the purge valve 108) is displayed on the display unit 119, it is determined that there is a portion where the leakage occurs in the flow passage piping on the upstream side of the purge valve 108, and the user is urged to replace the component and the like.

When the pressure check result of the purge valve 108 is normal in step S402, the process proceeds to step S403, and pressure checking of the sample introduction valve (injection valve) 109 is continued. When the pressure check result of the sample introduction valve 109 is abnormal in step S403, the process proceeds to step S407, an alarm 6 (an alarm that there is leakage of liquid feeding between the sample introduction valve 109 and the purge valve 108) is displayed on the display unit 119, it is determined that there is a portion where the leakage occurs in the flow passage piping between the sample introduction valve 109 and the purge valve 108, and the user is urged to execute replacement.

When the pressure check result of the sample introduction valve 109 is normal in step S403, it is determined that there is a portion where leakage of liquid feeding occurs on the downstream side of the sample introduction valve 109, the process proceeds to step S404, an alarm 7 (an alarm that there is leakage on the downstream side of the sample introduction valve 109) is displayed on the display unit 119, and the user is urged to execute replacement.

In step S208 of FIG. 2, when the pressure is apparently low, leakage of a visible degree can be checked, however, when the pressure is slightly low, there is a case that invisible slight slow leakage occurs, and execution of the work follow illustrated in FIG. 4 is useful in finding the leaking position.

As described above, according to the first embodiment of the present invention, with respect to equilibration of the column performed as a preparatory operation of the measurement, determination of completion is automatically executed, and when an error occurs simultaneously in the equilibration process, the error position is identified, and the alarms 1 to 7 are displayed on the display unit 119.

Therefore, it is possible to provide an automatic analyzer including HPLC and a control method for the same enabling to automatically execute determination of completion with respect to equilibration of the column and to simultaneously identify the position of an error when the error occurs in the equilibration process.

Second Embodiment

Next, the second embodiment of the present invention will be explained.

Figure 5:
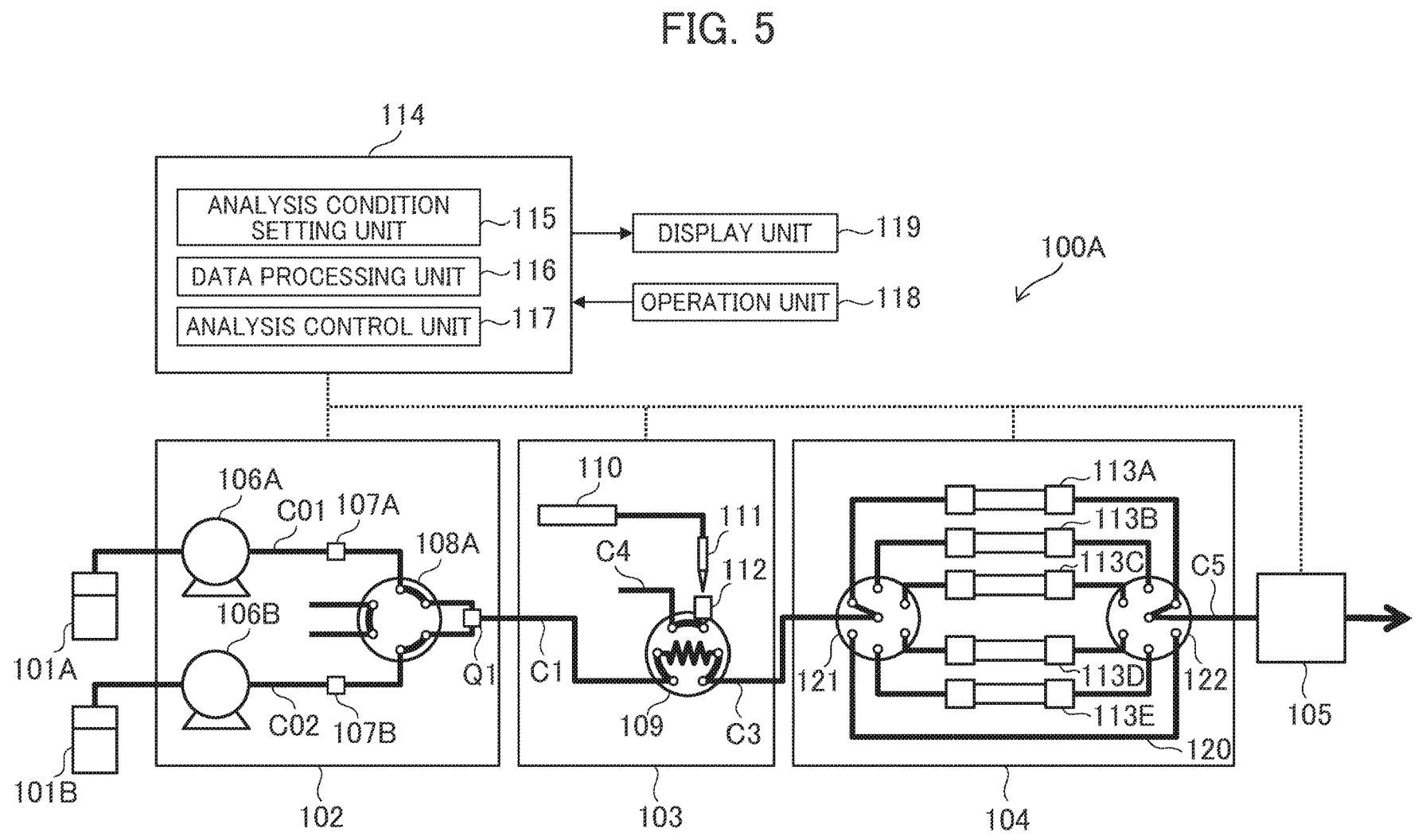

FIG. 5 is a schematic configuration drawing of an automatic analyzer 100A including HPLC related to the second embodiment. In FIG. 5, with respect to a configuration element same to that of the first embodiment, a same reference sign will be marked, and duplicated explanation will be hereinafter omitted.

In the automatic analyzer 100A including HPLC related to the second embodiment, the point different from the first embodiment is that two sets of liquid feed device 106A (first liquid feed device) and 106B (second liquid feed device) are provided in the liquid feed unit 102, and two sets of the liquid feed device 106A and 106B are connected to different mobile phase tanks 101A (first mobile phase tank) and 101B (second mobile phase tank) respectively.

To liquid feed flow passages C01 and C02 connected to discharge ports of the liquid feed devices 106A and 106B, pressure detectors 107A and 107B are connected respectively. Also, on the downstream side of two sets of the liquid feed devices 106A and 106B, there is arranged a purge valve 108A for selectively switching the analysis flow passage and the waste liquid flow passage. The mobile phase discharged from the purge valve 108A is introduced to the sample introduction unit 103 through a joint unit Q1.

The configuration of the sample introduction unit 103 is same to that of the first embodiment. Further, although the joint unit Q1 is disposed on the downstream side of the purge valve 108A in an example illustrated in FIG. 5, it is also possible to dispose the joint unit Q1 on the upstream side of the purge valve 108A. In this case, a pressure detector shared by the liquid feed devices 106A and 106B can be disposed on the downstream side of the joint unit Q1 and on the upstream side of the purge valve 108A.

On the other hand, the column temperature regulation unit 104 is configured to be capable of storing plural separation columns 113A, 113B, 113C, 113D, and 113E which are disposed to be parallel to each other. The plural separation columns 113A to 113E include fillers which have properties different from each other. In addition, the column temperature regulation unit 104 includes a bypass flow passage 120 introducing the mobile phase to the detector 105 without going through the separation columns 113A to 113E.

This bypass flow passage 120 is disposed in parallel to the plural separation columns 113A to 113E in the column temperature regulation unit 104.

The column temperature regulation unit 104 includes a column switching valve (first column switching valve) 121 and a column switching valve 122 (second column switching valve) for selectively connecting optional separation columns 113A to 113E or the bypass flow passage 120 to the analysis flow passage on the upstream side and the downstream side of the separation columns 113A to 113E.

The column switching valves 121 and 122 include plural first pipe connection portions connected to the separation columns 113A to 113E and the bypass flow passage 120, a second pipe connection portion connected to the analysis flow passage (analysis flow passage C3, an analysis flow passage connecting the column switching valve 122 and the detector 105 to each other), and a movable flow passage for selectively connecting the first and second pipe connection portions.

One end of the movable flow passage rotates around one end portion of the second pipe connection portion so as to be connected to any one of the first pipe connection portion, and thereby any one of the plural separation columns 113A to 113E or the bypass flow passage 120 can be connected to the analysis flow passage.

Here, with respect to the column switching valves (column selector valves) 121 and 122, it is also possible to set not only a state that any one of the plural separation columns 113A to 113E or the bypass flow passage 120 is connected to the analysis flow passage C3 or C5 but also a state of not being selectively connected to any one of the separation columns 113A to 113E or the bypass flow passage 120 (closed state).

Figure 6:
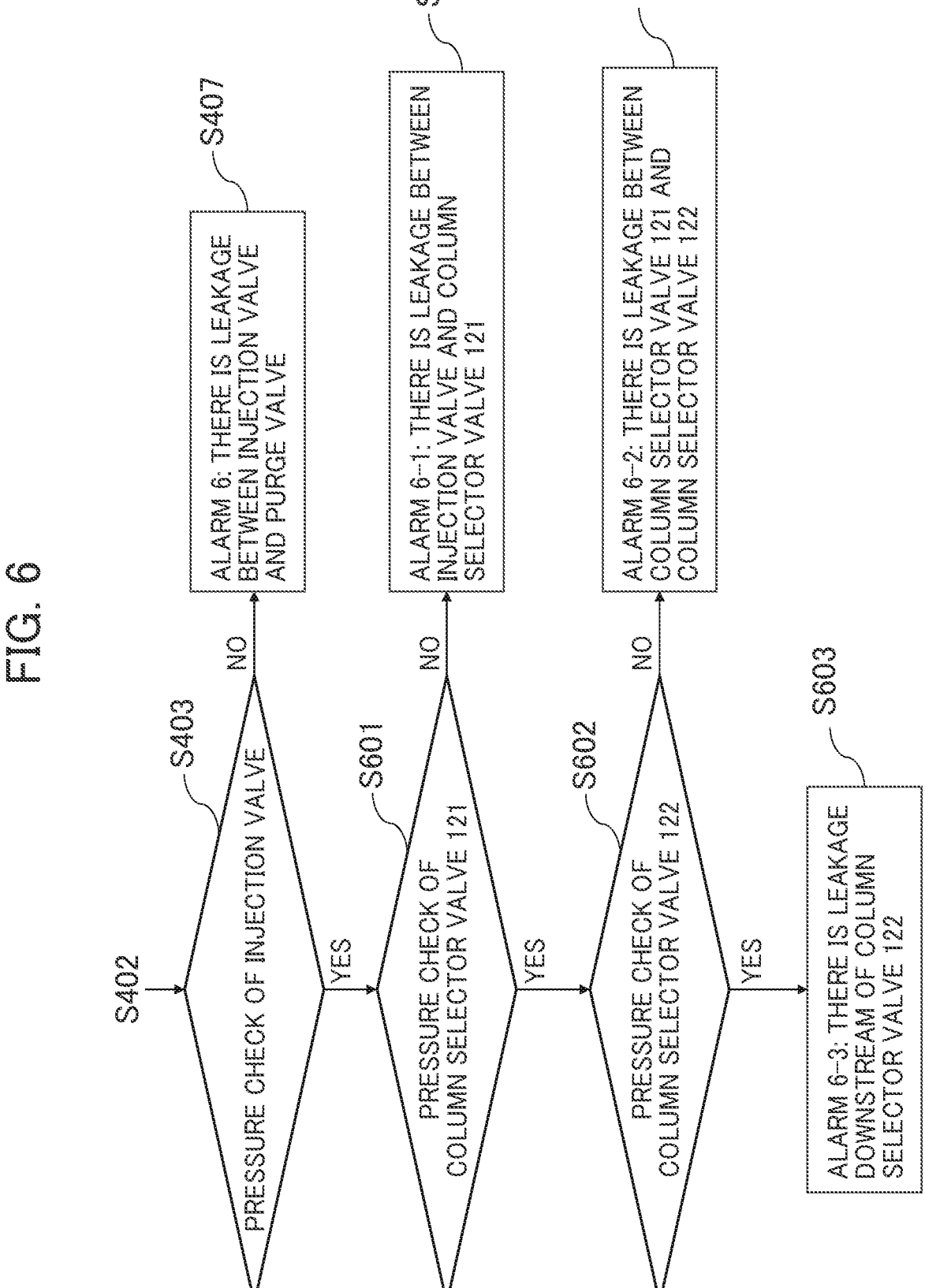
FIG. 6 is a flowchart in executing an identification process of a leak position in the second embodiment.

Since the column selector valves 121 and 122 have a configuration of being capable of becoming the closed state, as shown in the flowchart illustrated in FIG. 6, in step S403 of FIG. 4, when the pressure check result of the sample introduction valve 109 is normal in step S403 of FIG. 4, by executing pressure check process steps S601 to S605 of the column switching valves 121 and 122, it is possible to determine in which portion leakage has occurred. Since the processes before step S403 of FIG. 6 are similar to FIG. 4, description on them will be omitted.

When pressure checking is executed with the column selector valve 121 being kept in a closed state and the pressure check result is abnormal in step S601 of FIG. 6, the process proceeds to step S604, an alarm 6-1 (an alarm that there is leakage between the sample introduction valve (injection valve) 109 and the column selector valve 121) is displayed on the display unit 119, and the user is urged to execute replacement.

When the pressure check result of the column switching valve 121 is normal in step S601, the process proceeds to step S602, and pressure checking of the column switching valve (column selector valve) 122 is executed.

Here, pressure checking is executed with the flow passage between the column switching valves 121 and 122 being connected to the bypass flow passage 120.

When pressure checking is executed in a state of being connected to the flow passage where the column is disposed, it is also possible to execute pressure checking in a manner that the column having been disposed is detached once and the flow passage is connected using a union and the like, or an empty column where the filler is not filled is used.

When the pressure check result of the column switching valve 122 is abnormal in step S602, an alarm 6-2 (an alarm that there is leakage in a flow passage piping between the column switching valve (column selector valve) 121 and the column switching valve (column selector valve) 122) is displayed on the display unit 119, and the user is urged to execute replacement.

When pressure checking of the column switching valve 122 is normal in step S602, an alarm 6-3 (an alarm that leakage occurs in a flow passage piping on the downstream side of the column switching valve 122) is displayed on the display unit 119, and the user is urged to execute replacement.

Figure 7:
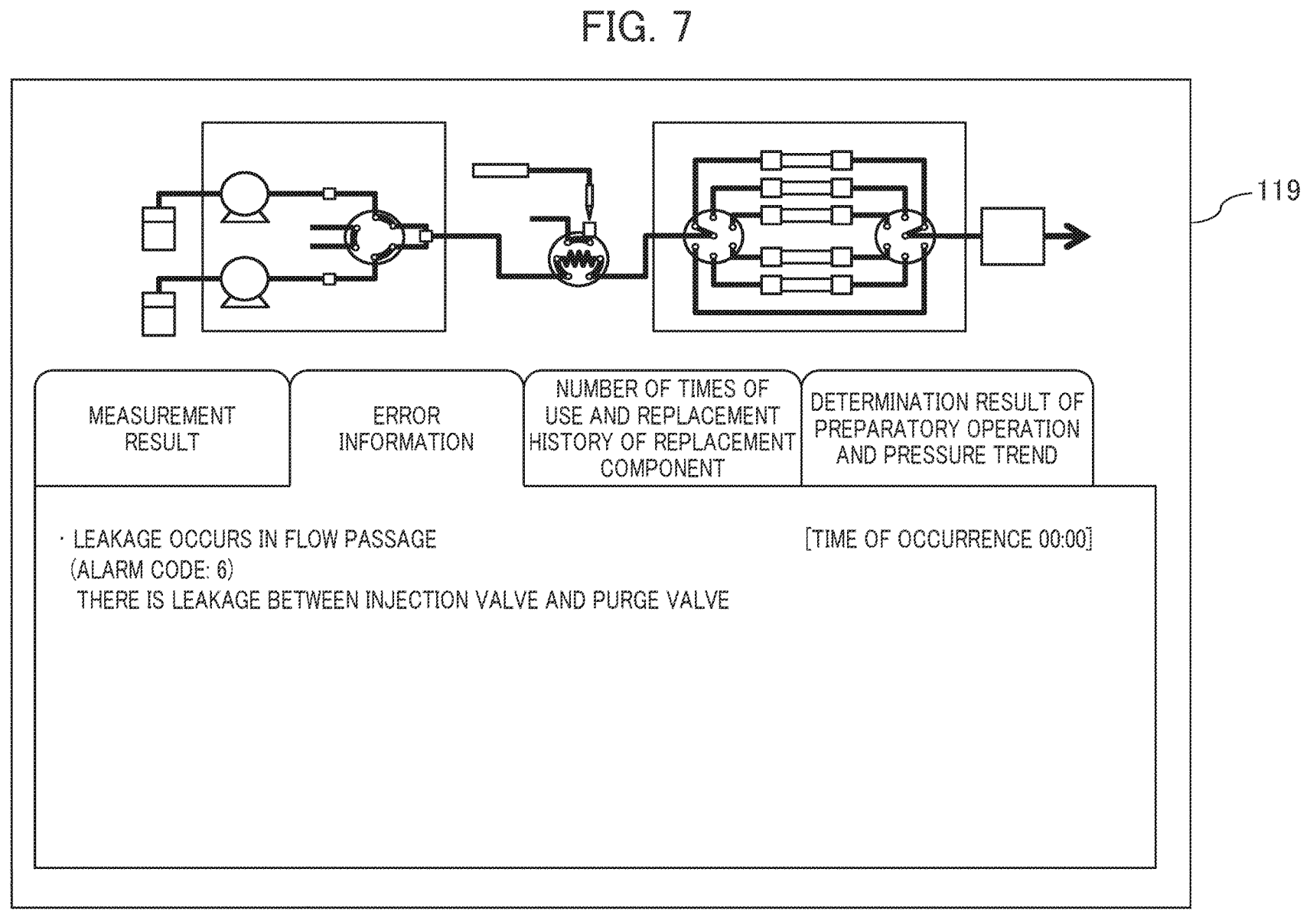

Here, the display unit 119 illustrated in FIG. 5 will be illustrated in detail in FIG. 7.

As illustrated in FIG. 7, on the display unit 119, it is possible to display the measurement result, the error information, the number of times of use of each replacement component, the replacement history of each replacement component, the determination result of the present preparatory operation, and the temporal change information (trend) of the pressure value along with the schematic drawing of the device configuration as FIG. 5, and the degree of the risk predicted from the trend can be shown on the schematic drawing.

By executing the process described above, such preparatory operation is enabled that in which portion leakage has occurred is determined, the water leakage accident is prevented beforehand, and the analysis is executed precisely.

That is to say, in the second embodiment also, similarly to the first embodiment, it is possible to provide an automatic analyzer including HPLC and a control method for the same enabling to automatically execute determination of completion with respect to equilibration of the column and to simultaneously identify the position of an error when the error occurs in the equilibration process which is executed as a preparatory operation of the measurement.

Also, in the second embodiment, it is possible to provide an automatic analyzer including HPLC and a control method for the same capable of determining in which portion of the column temperature regulation unit 104 leakage has occurred when it is configured that the plural separation columns 113A to 113E can be stored in the column temperature regulation unit 104.

[On Modification of the Present Invention]

The present invention is not limited to the embodiments described above, and various modifications are included. For example, the embodiments described above were explained in detail for easy understanding of the present invention, and are not to be necessarily limited to those including all configurations having been explained. That is to say, various alterations, additions, and deletions can be effected on a part of the configuration of the embodiment.

For example, detection of the defect of the automatic analyzer of the present invention does not have to be checking of the pressure sensor value at the time of the preparatory operation, and detection of the position of the defect may be executed. In addition, detection of the position of the defect may be executed based on "fluctuation of the holding time", "fluctuation of the pressure curve", "peak strength of the sample", "information of the peak width and the like", and so on at the time when QC measurement described above is executed other than the time of the preparatory operation.

LIST OF REFERENCE SIGNS 101, 101A, 101B: mobile phase tank
102: liquid feed unit
103: sample introduction unit
104: column temperature regulation unit
105: detector
106, 106A, 106B: liquid feed device
107, 107A, 107B: pressure detector (pressure sensor)
108, 108A: purge valve
109: injection valve
110: sample metering pump
111: needle
112: sample introduction port
113, 113A, 113B, 113C, 113D, 113E: separation column
114: integrated control unit
115: analysis condition setting unit
116: data processing unit
117: analysis control unit
118: operation unit
119: display unit
120: bypass flow passage
121, 122: column switching valve

The invention claimed is:

1. A control method of an automatic analyzer for HPLC, wherein the automatic analyzer includes:
 a liquid feed unit including a liquid feed device and a liquid feed flow passage connected to the liquid feed device and feeding a mobile phase;
 a sample introduction unit introducing a sample to the mobile phase fed from the liquid feed unit;
 a separation column, the sample being introduced to the separation column from the sample introduction unit, the separation column separating the sample into a plurality of components;

a detector detecting the component separated by the separation column; and a control unit controlling the liquid feed unit, the sample introduction unit, and the detector, the liquid feed unit including a purge valve connected to the liquid feed flow passage and a waste liquid flow passage, the liquid feed unit and the sample introduction unit being connected to each other through a first analysis flow passage, the purge valve being allowed to selectively connect the liquid feed flow passage to the first analysis flow passage or the waste liquid flow passage, the sample introduction unit including a sample introduction valve introducing the sample to the mobile phase introduced from the first analysis flow passage, the control method of an automatic analyzer for HPLC comprising steps of:

detecting pressure of the liquid feed flow passage;

calculating a pressure rise rate immediately after starting liquid feeding of the mobile phase by the liquid feed unit and a compression pressure variation amount and a pressure average after continuing liquid feeding of the mobile phase by the liquid feed unit by a certain time based on the pressure detected;

determining whether or not the pressure rise rate is within a specified rise rate value, the compression pressure variation amount is within a specified compression pressure variation amount value, and the pressure average is within a specified pressure range;

when the pressure rise rate is greater than the specified rise rate value, allowing a display unit to display an alarm for replacing the separation column, liquid feed flow passage, waste liquid flow passage, or first analysis flow passage;

in a case the pressure rise rate is within a specified rise rate, when the compression pressure variation amount is not within the specified compression pressure variation amount value, determining whether or not the pressure variation amount is within the specified pressure variation amount value by a predetermined number of times of determination, and when the compression pressure variation amount is not within the specified compression pressure variation amount value, allowing the display unit to display an alarm of purging and cleaning of the feed flow passage, waste liquid flow passage, or first analysis flow passage; and in a case the pressure rise rate is within a specified rise rate and the pressure variation amount is within the specified pressure variation amount value, when the pressure average is within a specified pressure range, determining completion of equilibration of the separation column, when the pressure average is higher than a specified pressure upper limit value, allowing the display unit to display an alarm of replacing a separation column or piping, and when the pressure average is lower than a specified pressure lower limit value, determining in where leakage has occurred.

2. The control method of an automatic analyzer for HPLC according to claim 1, further comprising steps of:

when the pressure average is lower than the specified pressure lower limit value, determining whether or not the compression pressure variation amount is a specified compression pressure variation amount or below, when the compression pressure variation amount is the specified compression pressure variation amount or below, allowing the display unit to display an alarm that leakage of feed liquid has occurred from a cylinder within the liquid feed unit;

when the compression pressure variation amount is not the specified compression pressure variation amount or below, executing pressure check of the purge valve, when result of the pressure check is not within the specified pressure variation amount value, allowing the display unit to display an alarm that leakage of feed liquid has occurred on the upstream side of the purge valve;

when result of the pressure check of the purge valve is within the specified pressure variation amount value, executing pressure check of the sample introduction valve, when result of the pressure check of the sample introduction valve is not within the specified pressure variation amount value, allowing the display unit to display an alarm that leakage of feed liquid has occurred between the sample introduction valve and the purge valve, and when result of the pressure check of the sample introduction valve is within the specified pressure variation amount value, allowing the display unit to display an alarm that leakage of feed liquid has occurred downstream of the sample introduction valve.

3. The control method of an automatic analyzer for HPLC according to claim 1, the separation column being a plurality of separation columns arranged to be parallel to each other, the automatic analyzer including:

a bypass flow passage arranged in parallel to a plurality of the separation columns;

a first column switching valve capable of selectively connecting any one of a plurality of the separation columns and the bypass flow passage and the sample introduction valve to each other and capable of setting a state of not being selectively connected to any one of a plurality of the separation columns and the bypass flow passage; and a second column switching valve capable of selectively connecting any one of a plurality of the separation columns and the bypass flow passage and the detector and capable of setting a state of not being connected selectively to any one of a plurality of the separation columns and the detector, the control method of an automatic analyzer including HPLC comprising steps of:

when the pressure average is lower than the specified pressure lower limit value, determining whether or not the compression pressure variation amount is a specified compression pressure variation amount or below, when the compression pressure variation amount is the specified compression pressure variation amount or below, allowing the display unit to display an alarm that leakage of feed liquid has occurred from a cylinder within the liquid feed unit;

when the compression pressure variation amount is not the specified compression pressure variation amount or below, executing pressure check of the purge valve, when result of the pressure check is not within the specified pressure variation amount value, allowing the display unit to display an alarm that leakage of feed liquid has occurred on the upstream side of the purge valve;

when result of the pressure check is within the specified pressure variation amount value, executing pressure check of the sample introduction valve, when result of the pressure check of the sample introduction valve is not within the specified pressure variation amount value, allowing the display unit to display an alarm that leakage of feed liquid has occurred between the sample introduction valve and the purge valve, when result of the pressure check of the sample introduction valve is within the specified pressure variation amount value, executing pressure check of the first column switching valve, when result of the pressure check is not within the specified pressure variation amount value, allowing the display unit to display an alarm that leakage of feed liquid has occurred between the sample introduction valve and the first column switching valve;

when result of the pressure check of the first column switching valve is within the specified pressure variation amount value, executing pressure check of the second column switching valve, when result of the pressure check of the second column switching valve is not within the specified pressure variation amount value, allowing the display unit to display an alarm that leakage of feed liquid has occurred between the first column switching valve and the second column switching valve, and when result of the pressure check of the second column switching valve is within the specified pressure variation amount value, allowing the display unit to display an alarm that leakage has occurred on the downstream side of the second column switching valve.

* * * * *